Figure 1:
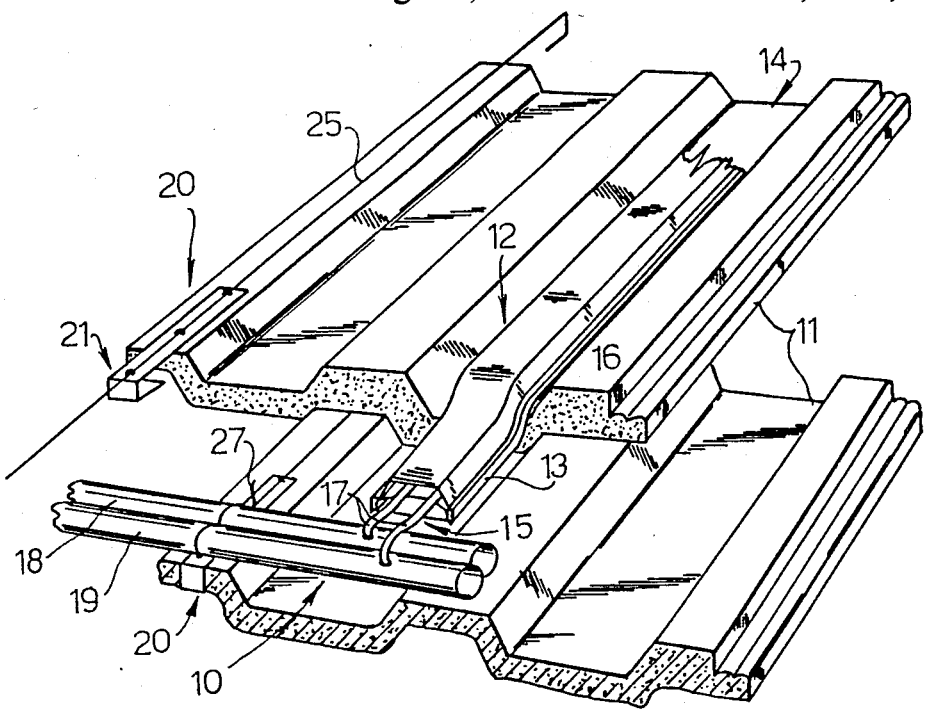

United States Patent [19]
Bloor et al.

[11] Patent Number: 4,606,327
[45] Date of Patent: Aug. 19, 1986

[54] SOLAR WATER HEATING APPARATUS

[76] Inventors: Trevor J. Bloor; Lawrence J. Walton, both of 8 Sunshine Blvd., Miami Keys, Gold Coast, Queensland, Australia, 4217

[21] Appl. No.: 680,981

[22] Filed: Dec. 12, 1984

Related U.S. Application Data

[63] Continuation-in-part of Ser. No. 549,594, Nov. 7, 1983, Pat. No. 4,517,961.

[30] Foreign Application Priority Data

Nov. 9, 1982 [AU] Australia ............................ PF6712

[51] Int. Cl.⁴ ................................................. F24J 2/00
[52] U.S. Cl. ............................ 126/417; 126/DIG. 2; 403/397; 403/400
[58] Field of Search ......... 126/448, 450, 432, DIG. 2, 126/442, 443, 417; 248/73, 237; 403/397, 392, 400

[56] References Cited

U.S. PATENT DOCUMENTS

| 4,233,963 | 11/1980 | Werner | 126/450 |
| 4,261,338 | 4/1981 | McAlister | 126/450 |
| 4,269,172 | 5/1981 | Parker | 126/450 |
| 4,517,961 | 5/1981 | Bloor et al. | 126/450 |

Primary Examiner—James C. Yeung
Attorney, Agent, or Firm—Murray Schaffer

[57] ABSTRACT

A clip is provided with first and second members to engage with opposing ends of a tile. The members are connected so as to be able to move relatively toward and away from each other so that detachable securement to the tile is possible. A constraint is provided to prevent substantial movement away from each other when attached to the tile.

17 Claims, 2 Drawing Figures

U.S. Patent    Aug. 19, 1986    4,606,327

SOLAR WATER HEATING APPARATUS

This application is a continuation-in-part of our co-pending application No. 549,594 filed Nov. 7, 1983, U.S. Pat. No. 4,517,961.

This invention relates to a clip assembly for attaching a member to a tiled roof and particularly to a clip assembly for attaching the manifolds of solar water heating apparatus to such a roof.

Solar water heating apparatus of the type including a flexible plastics or other synthetic material absorber which is mounted on a roof of a building so that water flowing through the absorber receives heat directly from the sun and in some instances by conduction from the roof surface is known. In one arrangement the absorber comprises a plurality of multi-tube ducting members which communicate with inlet and outlet manifolds supported on a roof such as the type disclosed in U.S. Pat. No. 4,269,172 and the heating apparatus is particularly designed for heating water in swimming pools.

One difficulty associated with this type of solar heating apparatus arises with the mounting of the inlet and outlet manifolds. In many instances it is necessary to drill holes in the roofing material, for example roofing tiles, so that the manifolds may be fixed thereto by fixing devices. This arrangement is somewhat time consuming and often results in excessive damage to the tiles.

The present invention aims to overcome or alleviate at least some of the above disadvantages by providing an improved clip assembly which is engageable with the tiles of a tile roof to positively secure a member thereto. In one particular arrangement, the clip assembly of the present invention is operative to support the inlet and outlet manifolds of a solar water heating apparatus on a tiled roof.

With the above and other objects in view, this invention resides broadly in a clip assembly for securing a body to a tile, said clip assembly including first and second portions adapted to be engaged with respective opposite ends of said tile; means interconnecting said first and second portions in such a manner as to permit said portions to move relatively towards each other for engagement with said tile and away from each other to permit detachment from said tile and there being provided means for constraining said first and second portions against substantial movement away from each other whereby said clip assembly when engaged with said tile may be prevented from detachment therefrom.

Figure 2:
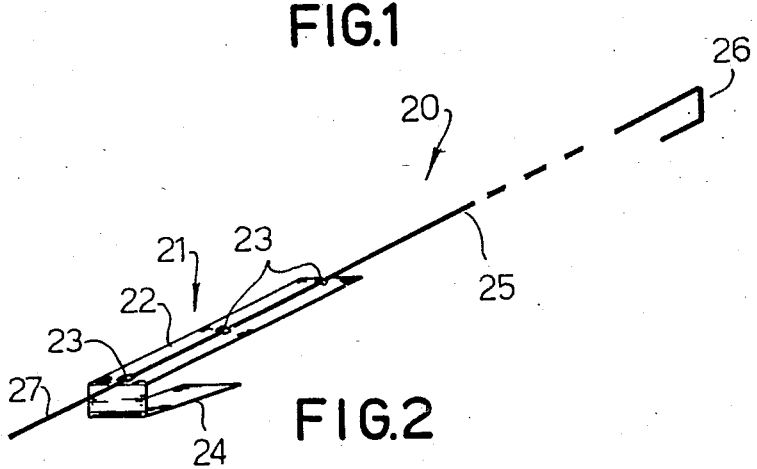

In order that the invention may be more readily understood and put into practical effect, reference will now be made to the accompanying drawings which illustrate a preferred embodiment of the invention and wherein:

FIG. 1 is a part perspective view showing a solar absorber assembly supported on a tiled roof and communicating with a pair of manifolds fixed to the tiles by a clip assembly according to one form of the present invention; and FIG. 2 is an enlarged view of the clip assembly illustrated in FIG. 1.

Referring to FIG. 1, there is illustrated portion of a solar water heating apparatus 10 supported on tiles 11 of a tiled roof. In this instance, the solar water heating apparatus 10 includes an absorber assembly 12 comprising a flexible base member 13 which is located in the recesses 14 defined by respective tiles 11 and which supports a ducting member 15 and a glazing member 16. The ducting member 15 includes a pair of tubular members 17 preferably interconnected by detachable webs which communicate at one end with respective water inlet and outlet manifolds 18 and 19. Preferably the tubular members 17 are interconnected at their ends remote from the manifold so that water flows from the inlet manifold 18 through both tubular members 17 to be thereby heated by virtue of exposure of the tubular members 17 to the sun, and outwardly through the outlet manifold 19. Of course the solar absorber assembly may be of any form such as that shown in U.S. Pat. No. 4,269,172 whilst each ducting member may be connected to the inlet and outlet manifolds and interconnected at their remote ends by the connection means disclosed in our co-pending U.S. application Ser. No. 475,317.

As shown the manifolds 18 and 19 extend transversely of the absorber assemblies and roof tiles 11 and are fixed to the roof tiles 11 by clip assemblies 20. Each clip assembly 20 includes a jaw member 21 which is preferably formed of strip material such as galvanised sheet metal plate or the like. The jaw member 21 is of generally U-shaped form and including one longer leg 22 provided with a plurality of aligned integrally formed eyes 23 and a shorter leg 24 adapted to be located on the underside of the tile 11. The clip assembly also includes an elongated wire 25 which is hooked at one end 26 so as to be engageable with the remote end of the tile 11 and which at its opposite end passes through the aligned eyes 23 in the jaw member 21.

In use and as shown in FIG. 1, the clip 20 is arranged so that the jaw member 21 and hooked portion 26 of the wire are located at opposite ends of a tile 11 to which the manifolds 18 and 19 are to be secured whereafter the free end 27 of the wire is pulled outwardly relative to the jaw member 21 to move the jaw member 21 and hooked portion 26 relatively inwardly into engagement with the opposite ends of the tile 11. Each manifold 18 and 19 is then located in position across the tiles 11 and the free end 27 of the wire bent around the manifolds 18 and 19 and twisted or looped about a portion of the wire 25 between respective eyes 23 so as to fix the manifolds 18 and 19 in position. It will be seen that as the wire is bent upwardly around the manifolds, the jaw member 21 and hooked portion 26 of the clip assembly 20 will be constrained against substantial outward movement so that the clip assembly 20 will be locked to the tile 11 and cannot be detached therefrom until the wire end 27 is again untwisted from the portion between the eyes 23 and straightened out thus permitting the hooked portion 26 and jaw member 21 to move apart.

The wire 25 may be slidably attached to the jaw member 21 by any suitable means whilst it will be realised that the jaw member 21 may be in many other forms than that illustrated. Furthermore, the clip assembly 10 is suitable for attaching any type of member to tiles of a tiled roof.

Thus the present invention provides a simple and inexpensive means which enables a member to be rapidly and securely attached to tiles of a tile roof. Of course many modifications and variations may be made to the invention by persons skilled in the art without departing from the broad scope and ambit of the invention as defined in the appended claims.

We claim:

1. A clip assembly for securing a body to a tile, said clip assembly including first and second portions adapted to be engaged with respective opposite ends of said tile; an elongated deformable member slidably engaging at least one of said first and second portions and interconnecting said first and second portions in such a manner as to permit said portions to move relatively towards each other to permit detachment from said tile said elongated member further defining constraining means operable to constrain said first and second portions against substantial movement away from each other whereby said clip assembly when engaged with said clip assembly when engaged with said tile may be prevented from detachment therefrom.

2. A clip assembly according to claim 1, wherein said elongated member passes through an aperture in said first portion and wherein said constraining means are adapted to constrain movement of said elongated member through said aperture in at least one direction.

3. A clip assembly according to claim 2, wherein said second portion includes a U-shaped member dimensioned for engagement with an end of said tile.

4. A clip assembly according to claim 3, wherein said U-shaped member includes first and second legs adapted to be located on opposite sides of said tile one said leg including a said aperture therein adapted to adjustably receive said elongated member therethrough.

5. A clip assembly according to claim 4, wherein said leg includes a plurality of aligned said apertures adapted to receive said interconnecting means therethrough.

6. A clip assembly according to claim 5, wherein said apertures are defined by eyes in said leg.

7. A clip assembly according to claim 4, wherein said elongated member is deformed by bending the opposite end thereof adjacent said aperture and wherein said body is secured to said tile by looping said opposite end about said body and securing said opposite end to a further portion of said clip assembly.

8. A clip assembly according to claim 6, wherein said opposite end of said elongated member is twisted about an intermediate portion thereof.

9. A clip assembly according to claim 8, wherein said elongated member comprises a length of wire.

10. A clip assembly according to claim 2, and wherein said elongated member is deformed in use adjacent said first portion to define said constraining means.

11. A clip assembly according to claim 1, wherein said second portion comprises one end of said elongated member.

12. A clip assembly according to claim 11, wherein said one end of said elongated member is hooked and dimensioned for engagement with an end of said tile.

13. A clip assembly for securing a body to a tile, said clip assembly including first and second portions adapted to be engaged with respective opposite ends of said tile said first portion comprising a generally U-shaped member dimensioned for engagement with an end of said tile means interconnecting said first and second portions in such a manner as to permit said portions to move relatively towards each other to a first attitude for engagement with said tile and away from each other to a second attitude to permit detachment of said clip assembly from said tile, said interconnecting means being further engageable with said body to secure said body to said tile and said interconnecting means when engaged with said body being operable to constrain said portion against movement to said second attitude to thereby maintain said clip assembly in engagement with said tile and said body secured thereto.

14. A clip assembly according to claim 13, wherein said interconnecting means comprises an elongated deformable length of wire, said wire being hooked at one end to define said second portion.

15. A clip assembly according to claim 14, wherein said length of wire passes at its opposite end through an aperture in said U-shaped member, said opposite end in use being further looped about said body and engaged with an adjacent portion of said wire to secure said body to said tile.

16. A clip assembly according to claim 15, wherein said body comprises a manifold of solar water heating apparatus.

17. A clip assembly for securing a body to a tile, said clip assembly; including first and second engagement portions each said engagement portion being adapted for releasable engagement with the respective opposite ends of said tile, means interconnecting said first and second portions and being slidably engaged with at least one said portion so as to permit said portions to move relatively towards each other to a first attitude for engagement with the respective opposite ends of said tile to secure said clip assembly to said tile and away from each other to a second attitude to permit detachment of said clip assembly from said tile, said interconnecting means further defining constraining means arrangeable in use to prevent substantial movement of said engagement portions away from each other so that said clip assembly may be maintained in at least said first attitude and thereby be prevented from detachment from said tile.

* * * * *